May 6, 1969     W. P. SIEGMUND ET AL     3,442,568
LIGHT-MODULATING DEVICE
Filed Nov. 22, 1965
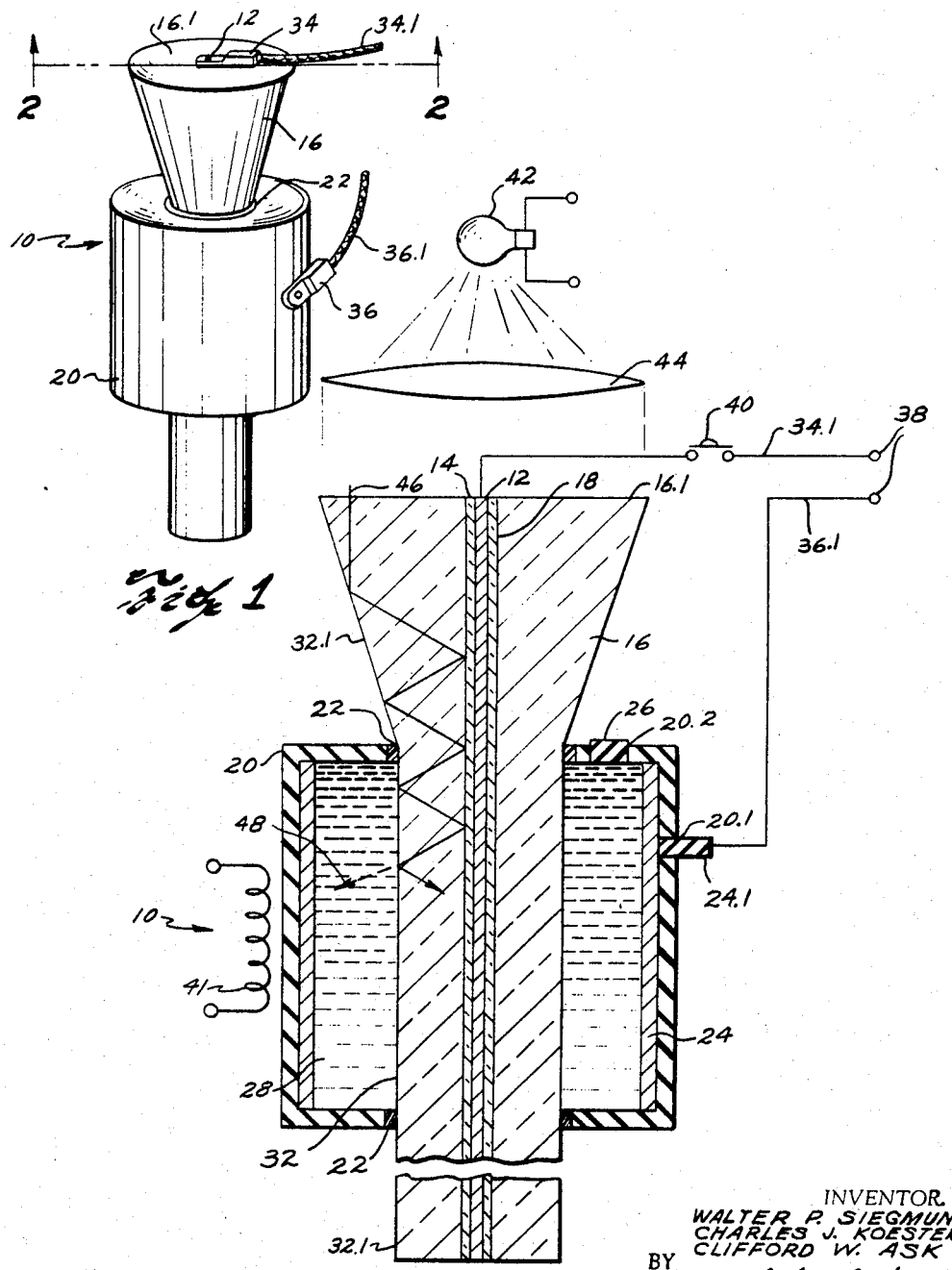
INVENTOR.
WALTER P. SIEGMUND
CHARLES J. KOESTER
CLIFFORD W. ASK
BY James P. McAndrews
ATTORNEY

3,442,568
LIGHT-MODULATING DEVICE
Walter P. Siegmund, Woodstock, and Charles J. Koester and Clifford W. Ask, South Woodstock, Conn., assignors, by mesne assignments, to American Optical Company, Southbridge, Mass., a corporation of Delaware
Filed Nov. 22, 1965, Ser. No. 509,086
Int. Cl. G02b 5/14
U.S. Cl. 350—96                             6 Claims

ABSTRACT OF THE DISCLOSURE

A light modulator having a relatively long and thin glass clad electrical conductor surrounded by a substantial thickness of light-transmitting high refractive index glass, a portion of the length of which is surrounded by a normally low refractive index light-transmitting Kerr effect material. Means is provided for selectively developing an electrical field through the Kerr effect material. Light is normally transmitted by total internal reflection through the high refractive index glass and is modulated by being at least partially diverted into the Kerr effect material when said electrical field is developed.

---

The field of this invention is that of light-modulating devices and the invention relates more particularly to a novel and improved device which operates to modulate light almost instantaneously in response to electrical control.

Various light-modulating devices are well known in which Kerr effect materials are employed as light modulators interposed in the paths of light beams for modulating said beams. Such prior art devices have been relatively bulky and have been effective only for modulating plane polarized light.

It is an object of this invention to provide a novel and improved light-modulating device; to provide such a device which is almost instantaneously operable; to provide such a device which is normally adapted for high light transmission but which is operable to substantially completely cut off light transmission; and to provide such a device which is capable of modulating light without requiring previous polarization of the light. It is an additional object of this invention to provide a light-modulating device which normally transmits light without requiring electrical operation but which is electrically operable to cut-off light transmission; to provide such a device which is easily adapted for automatic response to electrical controls; and to provide such a device which is of simple and economical construction.

Briefly described, the light-modulating device of this invention includes an electrically conductive metal fiber surrounded by a first, relatively thin cladding of light-transmitting material of selected, low refractive index. This clad conductor is surrounded by a second relatively thick and preferably tapered cladding of light-transmitting material of relatively higher refractive index material. Preferably these claddings are formed of glass and are fused together to form a first light-reflecting interface between the claddings. A Kerr effect material is then arranged to surround the doubly clad electrical conductor. The selected Kerr effect material normally displays a relatively lower refractive index than the second or outer cladding on the conductor so that a second, normally reflective interface is formed between said second cladding and the Kerr effect material. This second interface, like the first interface described above, is also adapted to reflect light which is incident on the interface from within the second cladding. In accordance with this invention, the selected Kerr effect material is such that, when subjected to an electrical field, the material displays a relatively higher refractive index than in the absence of the electrical field, preferably a refractive index which is higher than that of said second cladding material. The device includes means such as an electrode surrounding the Kerr effect material which cooperates with the clad electrical conductor to selectively establish such an electrical field within the Kerr effect material. In a preferred construction, the device includes means for intercepting light and for directing said light into one end of the second cladding of said conductor to be incident upon the interface between said second conductor and Kerr effect material.

In this construction, the device of this invention is adapted to be interposed in a light path for receiving light within one end of the second light conducting cladding to modulate the light. Normally this light is repeatedly reflected from the interface between said second cladding and Kerr effect material and from the interface between said second and first claddings in accordance with the well-known principles of total internal reflection. In this way the light is normally conducted through the device through the second conductor cladding. However, the device is operable to subject the Kerr effect material to an electrical field causing said material to display a relatively higher refractive index, preferably a refractive index which is higher than the refractive index of said second cladding material. When this is done, the interface between the second cladding and the Kerr effect material no longer reflects light and light received within the second light-conducting cladding is permitted to pass into the Kerr effect material to reduce or completely cut off light transmission through said second cladding. In this way, the light-modulating device is normally adapted for high light transmission but is electrically operable to modulate or completely cut off light transmission. Because the means establishing the described electrical field include a central conductor, the device is very responsive to electrical control and is almost instantaneously operable to effect light modulation. The device is also of simple and economical construction.

Other objects, advantages and details of construction of the device of this invention appear in the following detailed description of preferred embodiments of the invention, the description referring to the drawing in which:

FIG. 1 is a perspective view showing features of the light-modulating device of this invention; and FIG. 2 is a section view to enlarged scale along line 2—2 of FIG. 1.

Referring to the drawing, 10 in FIGS. 1 and 2 indicates the light-modulating device of this invention which is shown to include a first electrical conductor or electrode 12, preferably comprising a rod or filament of copper, stainless steel or the like. The device also includes a first light-transmitting element of low refractive index. For example, the conductor is covered with a first, thin cladding 14 of a light-transmitting material such as soda lime glass having a selected, low refractive index. Preferably, where the cladding material is glass, this first cladding is fused directly to the conductor 12 in any conventional manner.

The device also includes a second light-transmitting element. For example, a second or outer cladding 16 of another light-transmitting material such as flint glass of relatively higher refractive index is arranged over the first conductor cladding 14. Where the first and second claddings are both glass, the claddings are preferably fused together. In this way, the interface 18 between the high index and low index cladding materials is adapted to reflect light incident on the interface 18 from within the second conductor cladding in accordance with the well-known principles of total internal reflection. Preferably the second cladding 16 is tapered outwardly at one end 16.1 to facilitate the reception of light into the cladding 16.

The light-modulating device also includes a hollow cylinder or cell 20 which fits around at least a part of the periphery of the outer conductor cladding 16 and which is sealed to the cladding 16 in liquid-tight relation as shown in FIG. 2. The cell is preferably sealed to the cladding with a light-transmitting epoxy resin, cement, plastic or other material 22 having a relatively lower refractive index than the material of the cladding 16.

In a practical embodiment of this invention, another electrically conductive member or electrode 24 is fitted within the cell 20. This electrode or conductor is preferably cylindrical in shape and is arranged to fit entirely around the doubly clad conductor 12 in spaced, preferably concentric, relation thereto as shown in FIG. 2. This electrode 24 is fitted with tap means 24.1 so that electrical contact with the electrode 24 can be made from outside the cell 20. The electrode tap 24.1 is sealed in liquid-tight relation within an aperture 20.1 in the cell.

In accordance with this invention, the hollow cell 20 is filled through a port 20.2, normally sealed with a plug 26, with a light-transmitting Kerr effect material 28 such as nitrobenzene. A Kerr effect material comprises a liquid dielectric which is adapted to vary its optical properties to become doubly refracting i.e. to change the index of refraction for one polarization relative to that of the orthogonal polarization when subjected to an electrical field. The material of the second or outer conductor cladding 16 is selected so that, in the absence of an electrical field, the material normally displays a refractive index relatively higher than that of the selected Kerr effect material. Under these conditions, the interface 32 between the Kerr effect material and the outer cladding 16 comprises an interface of high index and low index materials. Thus the interface 32, like the interface 18, is adapted to reflect light which is incident on the interface from within the second cladding 16. In constructions where the cell 20 encloses only part of the outer periphery of the second cladding 16 as shown, the interfaces 32.1 between the second cladding and the surrounding air (of lower refractive index) are also adapted to reflect light incident in the interfaces 32.1 from within the second cladding as will be understood. However, the Kerr effect material is selected so that, when it is subjected to a suitable electrical field, the material becomes doubly refracting and displays a refractive index which is relatively higher than that of the second conductor cladding for one polarization of light. Under these conditions, the interface 32 does not reflect light incident therein from within the second cladding 16 but permits such light to pass through the interface into the Kerr effect liquid inside the cell 20.

The light-modulating device 10 is then arranged so that conductor 12 and the electrode 24 are cooperatively operable to establish a desired electrical field through the Kerr effect liquid 28. For example, as shown in FIG. 1, connectors 34 and 36 are attached to the conductor 12 and electrode tap 24.1 respectively and leads 34.1 and 36.1 selectively connect the conductor and electrode to a suitable power source. That is, as shown diagrammatically in FIG. 2, the leads 34.1 and 36.1 are connected to a power source indicated by the terminals 38, and a switch 40 of any conventional type is interposed in the lead 34.1.

Note that the second conductor cladding 16 prevents the wasteful flow of electrical current through the Kerr effect material and therefore prevents inadvertent heating of the material such as might cause change in the refractive index of the material. On the other hand, heat control means of any conventional type, diagrammatically indicated by the heating coil 41 in FIG. 2, are advantageously used for controlling or adjusting the temperature and refractive index of the Kerr effect material independent of the electrical field established through the material.

In accordance with this invention, the light-modulating device 10 is adapted to be interposed in the path of light from a source diagrammatically indicated in FIG. 2 by the lamp 42. If desired, the device can include optical means diagrammatically indicated by the lens 44 for directing light from the source into the tapered or enlarged end 16.1 of the second conductor cladding 16. Under normal conditions, when the switch 40 is open so that no electrical field is established in the Kerr effect material 28, light from the source 42 received within the cladding 16 tends to be conducted through the cladding to the opposite end 16.2 thereof. That is, as is diagrammatically indicated by the light ray 46 in FIG. 2, light which is incident upon the light reflecting interfaces 18, 32 and 32.1 at suitable angles is repeatedly reflected from the interfaces in accordance with the well-known principles of total internal reflection to be advanced through the cladding 16. However, when the switch 40 is closed, an electrical field is established between the conductor 12 and electrode 24 which causes the Kerr effect liquid 28 to display a different refractive index relatively higher than that of the cladding 16 for light of one plane of polarization. When this occurs, the interface 32 is no longer adapted to reflect light of this polarization in accordance with the principles of total internal reflection. As a result when light entering the device is incident on the interface 32, part of the light is reflected from the interface but that component of the light which is of the noted plane of polarization passes through the interface into the Kerr effect material 28 as indicated in FIG. 2 by the dotted arrow 48. In addition, the part of the light which is reflected from the interface will be repeatedly reflected at random locations along the interface. Because of the random nature of these reflections from the peripheral interface 32, a component of the light at each reflection is likely to be of the noted plane of polarization to be transmitted through the interface. As a great many reflections from the interface are necessary to conduct light through the device and as a component of the light is transmitted through the interface at substantially all of the reflections, substantially no light is conducted entirely through the device. As will be understood, light transmitted through the interface is then absorbed by the electrode 24 or the cell 10. In his way, the device 10 is adapted to modulate light from the source 42. Because the conductor 12 and electrode 24 are preferably located in concentric relation to each other, the electrical field established between the conductor and electrode is uniform entirely around the device 10 and effects cutoff of light-transmission through the cladding 16 almost instantaneously after closing of the switch 40. Further, because light must be repeatedly reflected from the interface 32 in order to be conducted through the device 10, the device is effective to substantially completely cut off light transmission when the interface 32 becomes less reflective after closing of the switch 40. It can be seen that the light-modulating device 10 is of simple and economical construction. It can also be seen that the device is normally adapted for high light transmission and requires use of electrical power only to cut off light-transmission.

It should be understood, that the light-modulating device 10 has been described by way of illustration and that this invention includes all modifications and equivalents thereof.

We claim:

1. A light modulating device comprising a relatively long and thin electrical conductor, a first cladding of light-transmitting material of selected refractive index surrounding said conductor, a second relatively thick cladding of light-transmitting material surrounding said first cladding, said second cladding having a higher refractive index than said first cladding and forming a first light-reflecting interface between said claddings, said second cladding being surrounded by a light-transmitting material disposed around and in optical contact with said second cladding along at least a substantial portion of the length thereof, said material normally displaying a relatively lower refractive index than said second cladding for forming a second light-reflecting interface along said second cladding, whereby light directed into one end of said second cladding will propagate therethrough by total internal reflection, said material further being selectively doubly refracting by Kerr effect for displaying a refractive index higher than that of said second cladding for at least one polarization of said light directed into said second cladding, whereby portions of said light of said one polarization will divert into said material when said material is rendered doubly refracting, an electrode surrounding said material, a source of electrical current and means for selectively connecting said conductor and electrode in circuit with said source of electrical current for producing said Kerr effect.

2. A light-modulating device as set forth in claim 1 wherein said electrode is cylindrical and is disposed in spaced, concentric relation to said clad electrical conductor.

3. A light-modulating device as set forth in claim 1 wherein a cell is fitted over and secured to said second cladding for forming a chamber surrounding said portion of the length thereof and wherein said Kerr effect material and electrode are confined within said chamber around said second cladding.

4. A light-modulating device as set forth in claim 3 wherein said Kerr effect liquid comprises nitrobenzene.

5. A light-modulating device as set forth in claim 3 wherein the portion of the length of said second cladding surrounded by said chamber is of selected thickness and wherein said second cladding extends outside said cell at one end and is tapered to a greater thickness at said end for facilitating the reception of light directed thereinto.

6. A light-modulating device as set forth in claim 5 incorporating optical light projecting means for directing light into said second cladding at said one end.

References Cited

UNITED STATES PATENTS

| | | |
|---|---|---|
| 2,569,127 | 9/1951 | Eltenton. |
| 3,240,987 | 3/1966 | Hicks _____ 350—96 X |
| 3,379,486 | 4/1968 | Ujhelyi et al. _____ 350—160 X |

JOHN K. KORBIN, *Primary Examiner.*

U.S. Cl. X.R.

350—150